July 22, 1969    E. T. ANGUS ET AL    3,457,480
TAPE CONTROLLED SERVO FOR A MACHINE TOOL INCLUDING A UNIQUE
PULSE WIDTH MODULATED MOTOR CONTROL
Filed May 18, 1966      4 Sheets-Sheet 1

E. T. ANGUS
H. MAC D. ARTHUR
J. Y. C. MONTGOMERY
D. F. WALKER
R. S. J. GOOD
Inventors BY Cameron, Kerkam & Sutton, Attorneys

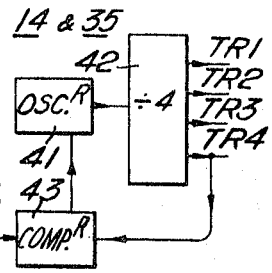
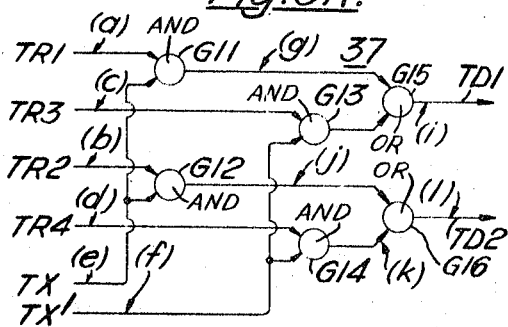
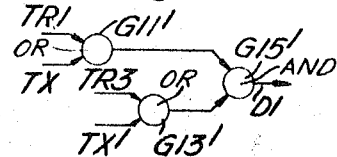
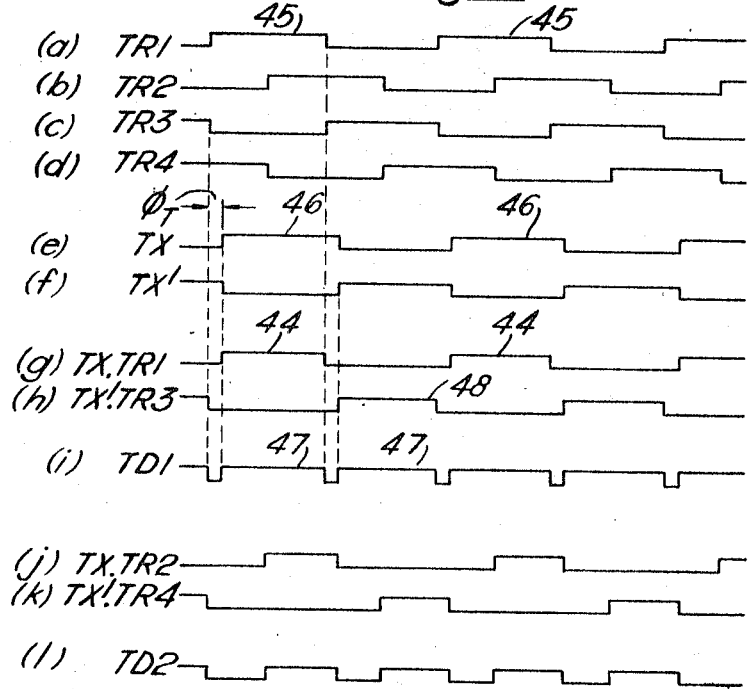

united States Patent Office 3,457,480
Patented July 22, 1969

3,457,480
TAPE CONTROLLED SERVO FOR A MACHINE TOOL INCLUDING A UNIQUE PULSE WIDTH MODULATED MOTOR CONTROL
Ernest Thomas Angus, Hugh Macdonald Arthur, John Young Condie Montgomery, and Donald Ferguson Walker, Edinburgh, Scotland, and Richard Samuel Jonathan Good, Leicester, England, assignors to Ferranti, Limited, Hollinworth, Lancashire, England, a company of the United Kingdom of Great Britain and Northern Ireland
Filed May 18, 1966, Ser. No. 551,152
Claims priority, application Great Britain, May 20, 1965, 21,330/65
Int. Cl. G05b *19/16;* B23q *35/14*
U.S. Cl. 318—18          7 Claims

ABSTRACT OF THE DISCLOSURE

Apparatus for the closed-loop servocontrol of a machine tool in dependence on the relative phase of recorded demand signals, in which N rectangular signals width-modulated in dependence on said relative phase of the demand signals are used to gate and combine into a servomotor control signal N rectangular signals at a higher repetition frequency than said first rectangular signals and width-modulated in dependence on the tool position.

---

Figure 1:
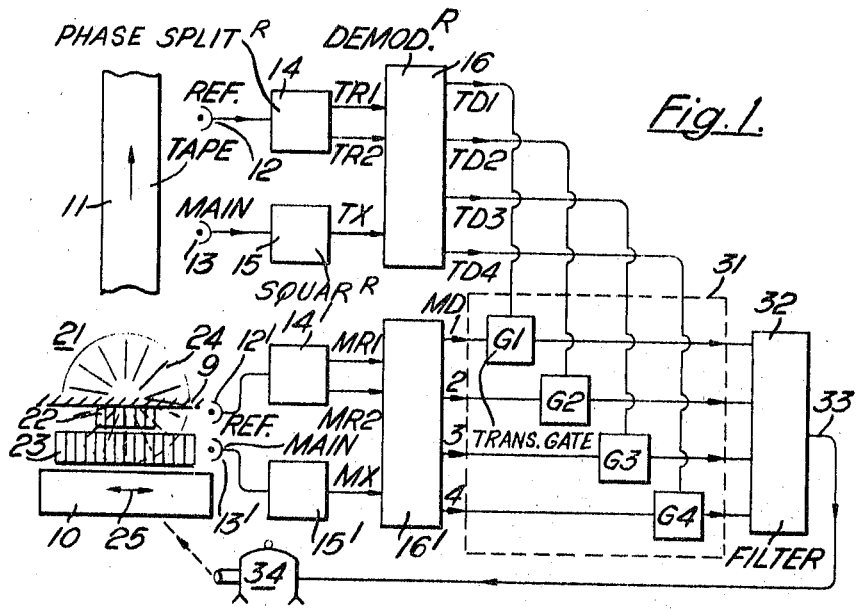

This invention relates to servo apparatus for controlling the position of an object in dependence on the relative phase of cyclic reference and main demand signals.

The object may be a workpiece or part of a machine tool, and the signals may be derived from a recording medium such as magnetic tape. In such applications of the invention where the required position of the object— the worktable, say—is represented by the relative phase of two recorded signals, it is known to derive a measurement of the object's position in terms of the relative phase of two electrical signals derived by photoelectric methods from patterns set up by optical gratings. One pattern is arranged to move with the table and the other is fixed to act as a reference. Scanning arrangements are also made so that the signals are in the form of alternating currents of the same frequency representing the actual position of the table by their relative phase. That phase is compared with the relative phase of the recorded demand signals in some sort of comparator, the output from which is an error signal that represents at any given moment the difference between the actual position of the table and that required by the demand signals at that moment. The error signal is applied to a servo actuator to adjust the position of the table.

A disadvantage of this known arrangement is that it is necessary to synchronize the scanning to the recorded reference frequency, and this is usually difficult to do with sufficient accuracy.

An object of the invention is to provide servo apparatus for the purpose stated which in particular is such as not to require such synchronisation.

In accordance with the present invention, servo apparatus for controlling the position of an object in dependence on the relative phase of cyclic reference and main demand signals includes means for deriving from the main signal under the control of the reference signal N first-combination rectangular signals width-modulated in such dependence on said relative phase of the demand signals that the mean level of each rectangular signal varies with that phase in accordance with a triangular law, the respective N cyclic triangular waveforms being symmetrically spaced with respect to one another, and N being an integer not less than three, means for deriving reference and main measurement signals the relative phase of which varies in dependence on the actual position of the object, means for obtaining from the main measurement signal under the control of the reference measurement signal N second-combination rectangular signals width-modulated similarly to the first-combination signals but in dependence on the relative phase of the measurement signals and at a considerably greater repetition frequency, a gating system for so gating the second-combination signals by the first-combination signals, each to each, as to produce N product signals the mean value of each of which over each cycle of the gating signal is proportioned to the product of the extents of width modulation of that signal and of the corresponding gated signal, a filter stage to derive from said product signals an error signal which varies in sense and value with the departure from a predetermined phase relationship of said relative phases with respect to one another, and servo-actuator means for applying the error signal to adjust the position of the object in the sense to counteract such departure.

By a "squarewave" signal is meant a rectangular signal the lengths of successive half-cycles of which are equal.

Figure 2A:
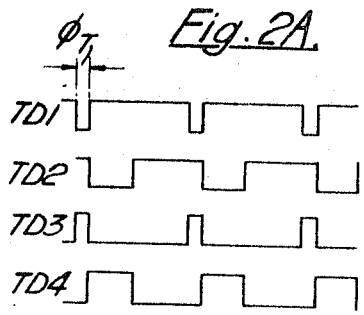
Figure 2B:
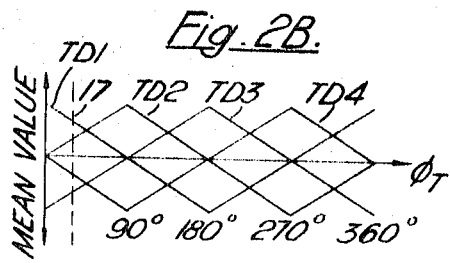
Figure 8:
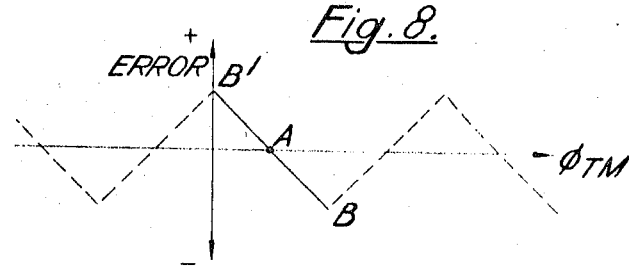
Figure 9:
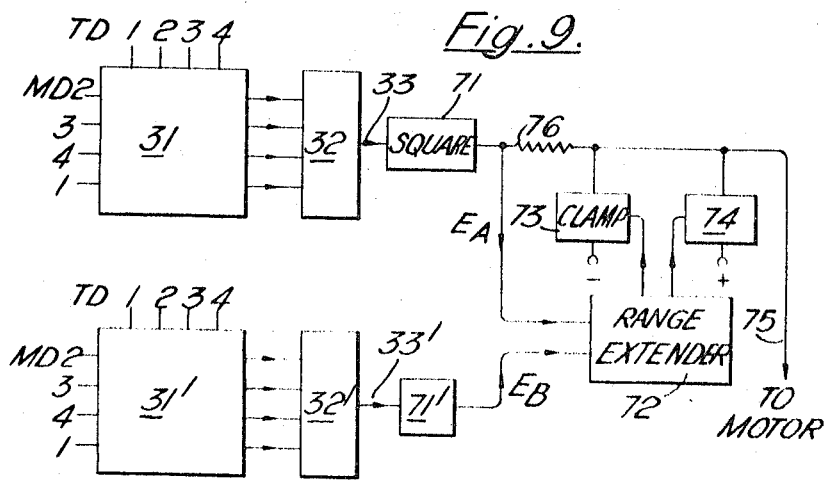
Figure 10:
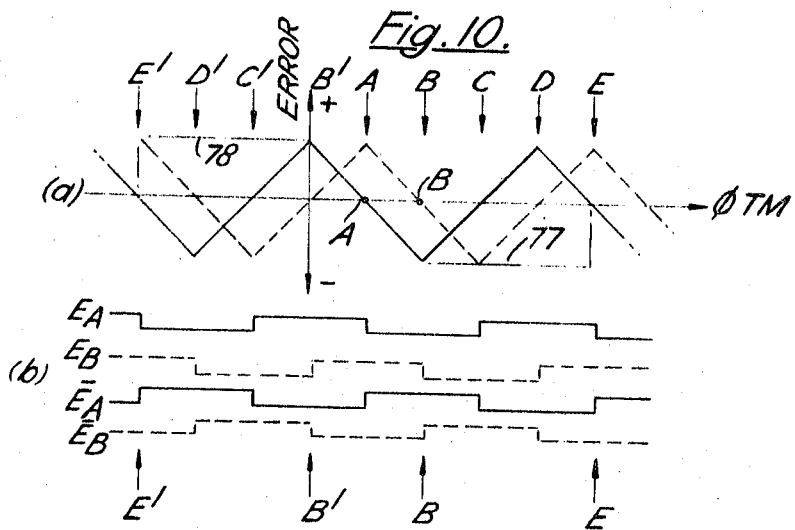
Figure 11:
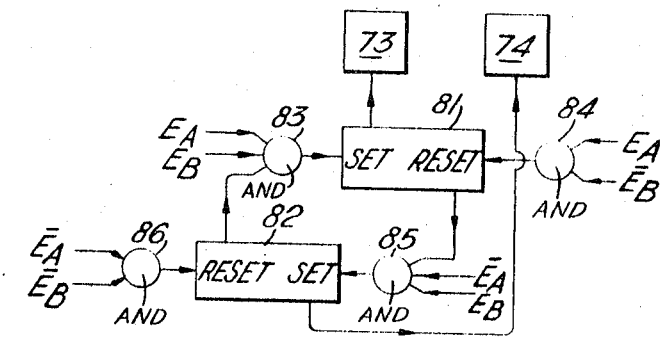

In the accompanying drawings:
FIGURE 1 is a schematic diagram of one embodiment of the invention,
FIGURES 2A and 2B show waveforms to illustrate the operation of the embodiment of FIGURE 1,
FIGURES 3 4, 5A, 5B and 7 each shows in somewhat more detail a part of the apparatus shown generally in FIGURE 1,
FIGURE 6 shows waveforms to illustrate the operation of the embodiment of FIGURE 5A,
FIGURE 8 is another waveform diagram to assist in the explanation,
FIGURES 9 and 11 are schematic diagrams showing a part of the embodiment of FIGURE 1 modified in accordance with another embodiment, and
FIGURE 10 shows waveforms to illustrate the operation of the embodiment of FIGURE 9.

The invention will first be described by way of example as applied to the control of the position of a worktable 10—see FIG. 1—with respect to the framework 9 of a machine tool in dependence on the relative phase $\phi_T$ of cyclic reference and main demand signals recorded in sinusoidal, triangular, or squarewave form in separate tracks as intensities of magnetisation along a magnetic tape 11.

In accordance with this embodiment of the invention, the servo apparatus for exercising that control includes pickoffs 12 and 13 for respectively deriving those signals in electrical form from the tape. Arrangemnts (not shown) are made for driving the tape past the pickoffs at a speed such that the derived signals have a frequency of 400 c./s.

The reference demand signal so derived by pickoff 12 is applied to a stage 14 arranged to obtain in fixed phase relationship to it at the 400 c./s. frequency two reference demand (Tape Reference) squarewave signals TR1 and TR2 (in output leads so designated in the drawing) which are in quadrature with one another.

The main demand signal derived by pickoff 13 is applied to a stage 15 arranged to obtain in fixed phase relationship to it at the 400 c./s. frequency a main demand squarewave signal TX in a lead so designated.

The TR and TX signals are all applied as inputs to a demodulation stage 16 arranged to derive from the TX signal under the control of the TR signals four first-combination rectangular signals TD1 and TD4 which are width-modulated in dependence on the relative phase $\phi_T$ of the recorded demand signals. These rectangular signals are the same in character as the signals D1 to D4 of our co-pending United States patent application No. 519,929. The dependence of these TD signals on $\phi_T$ is such that if the mean level of each signal is plotted against varying values of $\phi_T$, a cyclic triangular waveform results. The four triangular waves are symmetrically spaced with respect to one another—that is to say, they are equally spaced over 360°.

These relationships are illustrated in FIG. 2A, which shows the signals TD1 to TD4. In FIG. 2B is shown the mean value of each TD signal plotted against values of $\phi_T$ from 0° to 360°. The particular value of $\phi_T$ assumed in FIG. 2A is approximately indicated in FIG. 2B by the broken line 17. It should be particularly noted that the waveforms of FIG. 2B are plotted against $\phi_T$, not against time as in FIG. 2A.

For deriving reference and main measurement signals MR and MX the relative phase $\phi_M$ of which varies in independence on the actual position of the worktable, there is provided an optical grating system generally indicated at 21. This comprises a reference grating 22 secured to the tool framework 9, a main grating 23 secured to the worktable 10, and, common to both, a rotary grating 24 arranged to be rotated at a constant speed by a motor which is not shown. Gratings 22 and 23 have lines ruled normal to the direction 25 of the table movement, whereas grating 24 has the lines ruled radially. The line spacings are shown greatly exaggerated for clarity. The effect of this arrangement is that gratings 22 and 24 on the one hand, and gratings 23 and 24 on the other, set up respectively reference and main alternating optical patterns the frequency of which, as determined by the speed of rotation of grating 24, is 20 kc./s.—considerably higher than that of the signals derived from the tape. The relative phase of the patterns is dependent on the relative positions of gratings 23 and 22 and hence on the position of the worktable 10 relative to the frame 9.

The two patterns are sensed by reference and main photocells $12^1$ and $13^1$ which in response derive the reference and main measurement signals above referred to. These signals are respectively applied to stages $14^1$ and $15^1$ which correspond to stages 24 and 15 and like them develop two reference measurement squarewave signals MR1 and MR2 in quadrature and a main measurement squarewave signal MX, each at the higher frequency 20 kc./s.

The MR and MX signals are applied to a demodulation stage $16^1$ which operates similarly to stage 16 to derive from them four second-combination rectangular signals MD1 to MD4 having the 20 kc./s. frequency and width modulated in dependence on the relative phase $\phi_M$ of the signals derived from the grating system 21 just as the TD signals are width-modulated in dependence on $\phi_T$.

These second-combination signals are passed to a combined low-pass filter and amplifier stage 32 by way of a gating system 31 comprising gates G1 to G4 in the path of signals MD1 to MD4 respectively, and controlled by signals TD1 to TD4 respectively. The arrangement is such that during each of the more-positive half-cycles of signal TD1, gate G1 is held open to allow signal MD1 to pass through to stage 32. Because of the much greater frequency of the signals derived from the grating system, many cycles of signal MD1 are passed to stage 31 whilst the gate is thus held open. Signals MD2 and MD4 are similarly gated by signals TD2 to TD4. The signal output from each gate over a full cycle of the controlling TD signal is therefore at a mean potential proportional to the product of the extents of width modulation of the corresponding gated and gating signals and hence is dependent on the relative values of phases $\phi_T$ and $\phi_M$. Stage 32 operates to add these product signals and then smooth the resultant.

The invention relies on the facts that in a symmetrical N-phase system (by "symmetrical" is meant that the phases are equally spaced over a cycle) the algebraic sum of the instantaneous values of the respective phase potentials is always zero, and that if those N potentials are multiplied by the N instantaneous potentials, each to each, of another symmetrical N-phase system of the same frequency the sum of the resulting N products is zero if in each case the two potentials that are multiplied together are in phase quadrature, this sum departing from zero in the positive or negative sense according as that phase relationship respectively decreases or increases from the quadrature condition.

In the present invention the two symmetrical systems are the four-phase systems represented by the combination signals from stages 16 and $16^1$. The modulation frequencies (as distinct from the pulse repetition frequencies which, as indicated above, are considerably different) have each the comparatively low value representative of the tool movement, and the phase potentials (from which the product signals are derived) are the actual values of the extents of the respective width modulations.

Stage 32 thus provides over an output lead 33 an error signal which varies in sense and value with the departure of relative phases $\phi_T$ and $\phi_M$ from a quadrature relationship with one another. This error signal is applied to a motor 34 (or other form of actuator) which drives the worktable.

In operation, any departure in either sense of phase $\phi_M$ from quadrature with $\phi_T$ causes an error signal of appropriate sense to be developed by stage 32 and fed back to motor 34 to cause it to drive the worktable in the direction for nulling the signal, thereby bringing the actual position of the table into conformity with that demanded by the recorded signal.

Stage 16 for deriving the four combination signals TD1 to TD4 may be very similar to the corresponding stage for deriving signals D1 to D4 in our above-mentioned co-pending application.

Figure 3:
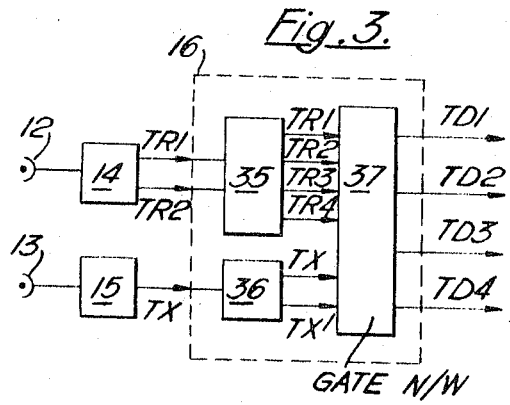

Thus, as shown in FIG. 3, stage 16 may include a stage 35 for deriving from the reference demand signals TR1 and TR2 two further reference demand signals TR3 and TR4 which are respectively in counterphase with them, and a stage 36 for similarly deriving from the main demand signal TX a further main demand signal $TX^1$ in counterphase with it, together with a gating network 37 which in response to these outputs from stages 35 and 36 derives the four combination signals TD1 to TD4.

Each of stages 14 and 36 may include a stage to square the input signal, followed by a flip-flop stage to derive the required two signals in counterphase.

Alternatively, stages 14 and 35 may be combined as shown in FIG. 4. An oscillator or free-running multivibrator 41 applies a squarewave signal at 1600 c./s. to a divide-by-four stage 42 designed to produce the signals TR1 to TR4 at the required 400 c./s. frequency in quadrature with one another over the four output leads so designated. To maintain these signals at the correct phase relationship to the signal from pickoff 12, one of them (TR4, in the arrangement depicted) is fed back for comparison with the signal from the pickoff in a comparator 43, the output from which is applied to control the frequency of oscillator 41.

Arrangements similar to either of the above may be provided for stage $16^1$. Where however the arrangement corresponds to that of FIG. 4, the oscillator will run at 80 kc./s. so as to produce the MR signals at the required 20 kc./s. frequency.

For deriving signals TD1 and TD2, stage 37 may take the form of the array of And and Or gates shown in FIG. 5A. Here the And gates G11 and G12 constitute the And gating means for combining the main signal TX with each of the two reference signals TR1 and TR2 to produce two rectangular signals TX.TR1 and TX.TR2 in a form to be described shortly. For this purpose signals TR1 and TR2 are applied as one of two inputs to gates G11 and G12 respectively, the other input of each being signal TX.

The And gates G13 and G14 are the means for deriving for each of rectangular signals TX.TR1 and TX.TR2 a like signal but displaced by 180 electrical degrees. These like signals are obtained by And-gating the signal TX$^1$ with signals TR3 and TR4, to produce signals TX$^1$.TR3 and TX$^1$.TR4 respectively.

The Or gates G15 and G16 are the Or-gating means for combining each of trains TX.TR1 and TX.TR2 with the corresponding 180 degrees displaced signal TX$^1$.TR3 or TX$^1$.TR4, as the case may be, to produce the two combination signals TD1 and TD2.

The manner in which the gates operate and the nature of the signals derived from them may best be understood from the following description of their operation, with reference to the voltage waveforms of FIG. 6. All these waves are of the rectangular kind, each consisting of portions which may be designated more-positive and more-negative and which follow one another alternately. For ease of reference these portions will be referred to simply as the positive and the negative portions, on the assumption that the zero voltage line transects each wave. It should however be understood that the zero line may be wholly above or wholly below the wave, with the result that both portions are negative or both positive, as the case may be.

From (a) to (d) are shown the reference signals TR1 to TR4, with TR2 in quadrature with TR1 and with TR3 and TR4 in counterphase with TR1 and TR2 respectively.

Waveform (e) is that of the main signal TX displaced in phase with respect to signal TR1 by the angle $\phi_T$, which represents the desired position of worktable 10 at the particular moment which the waveforms illustrate. Signal TX$^1$, in counterphase with TX, is shown at (f).

Gate G11 receives as inputs the signals TR1 and TX (waves (a) and (e)) and derives from them the signal TX.TR1 such that its positive portions 44—see wave (g)—are the result of And-gating the positive half-cycles 45 and 46 of the component squarewave signals R1 and X.

To derive for signal TX.TR1 the like signal displaced from it by 180 degrees, gate G13 similarly And-gates signals TX$^1$ and TR3, to produce signal TX$^1$.TR3 in the form shown at (h).

Gate G15 combines signals TX.TR1 and TX$^1$.TR3 by Or-gating them, thereby producing signal TD1 in the form shown at (i). As with the And gates G11 to G14, Or-gate G15 is concerned with the positive portions of the signals; thus the positive portions 47 of signal TD1 are the result of Or-gating the positive portions 44 and 48 of signals TX.TR1 and TX$^1$.TR3.

In a similar manner, gates G12, G14, and G16 derive signal TD2 from signals TX.TR2 and TX$^1$.TR4 as shown in waveforms (j), (k), (l).

By means of further gates (not shown) arranged similarly to those of FIG. 5A the TR and TX signals are combined to produce signals TD3 and TD4 of reverse sense to TD1 and TD2 respectively. Thus signal TD3 may be derived by first And-gating signals TX and TR3, and signals TX$^1$ and TR1, and producing signal TD3 by Or-gating those combinations. Similarly for signal TD4.

In an alternative arrangement, the And and Or gates may reverse their functions—the "And" becoming "Or," and the "Or" becoming "And." The effect of this is merely to shift the TD triangular waveforms of FIG. 2B through 180°. Thus as shown in FIG. 5B, the And gates G11 and G13 of FIG. 5A are replaced by Or gates G11$^1$ and G13$^1$, and Or gate G15 by an And gate G15$^1$. Similarly with the gates (not shown) for signals TR2 and TR4.

In another alternative, applicable to either embodiment, the gates may be such as to respond to the negative portions of the input signals, rather than to the positive portions as described.

Further, it is not essential that the signal polarity which is passed by the gates should be the same throughout. Thus if the part of the waveform that is passed by each of And gates G11 and G14 was the positive part, and the signals thus passed were reversed in polarity—for, say, convenience of circuit construction—the apparatus would still operate correctly provided that gates G15 and G16 were made And gates too.

The corresponding gate network (not shown) of demodulator 16$^1$ may be arranged and operate in a similar manner.

Figure 7:
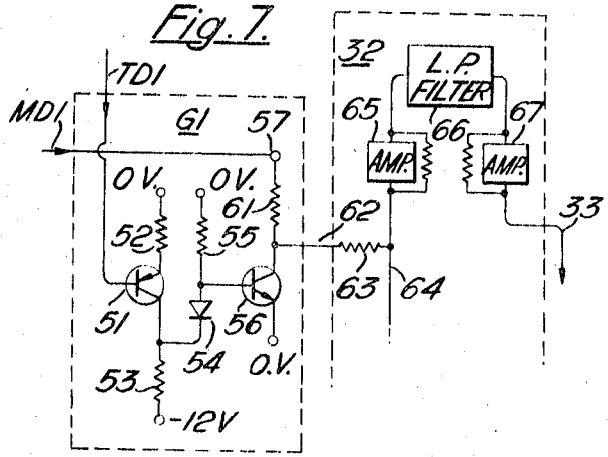

Suitable circuits for one of the gates G1 to G4 of gating system 31—gate G1, say—and for stage 32 are shown in FIG. 7.

The lead carrying the signal TD1 is applied to the base of a switching PNP transistor 51 the emitter and collector electrodes of which are connected to sources of zero and −12 volts by way of resistors 52 and 53 respectively. The collector electrode is also connected to the negative pole of a diode 54. The positive pole of the diode is biased by a connection to the zero volt source by way of a resistor 55 and is connected to the base of an NPN transistor 56. The emitter of this transistor is connected to the zero volts source. To its collector electrode is connected the lead which carries signal MD1 by way of the collector load terminal 57 and a load resistor 61. This electrode delivers the output of the gate over a lead 62 to stage 32. Transistor 56 is of the symmetrical type in which the functions of the collector and emitter electrodes are interchangeable, the gain remaining unaltered.

In stage 32, lead 62 is connected by way of a resistor 63 to a lead 64 which is common to all the gates and which is connected to the input of a negative-feedback amplifier 65. This arrangement serves to add together the product signals from all the gates in stage 31. The frequency spectrum of the resultant signal contains, in addition to the error signal (which is of low frequency—say 0 to 100 c./c.), certain unwanted components at the 400 c.s. of the tape signal and at the 20 kc./s. of the grating signal. To filter out both these higher components, the output from summation amplifier 65 is applied to a low-pass filter stage 66, designed to reject signals above, say, 300 c./s. The output from filter 66 is applied by way of a further negative-feedback amplifier 67 to lead 33 and the motor.

Broadly, as already mentioned, the gate operates to pass to stage 32 the signal MD1 substantially unmodified so long as a more-positive half-cycle of signal TD1 is present at the gate. In more detail, during each of those half-cycles of signal TD1 transistor 51 is cut off, thereby applying the −12 volt bias by way of diode 54 to hold transistor 56 cut off also. Whilst transistor 56 is cut off, the potential of its collector is approximately the same as that at terminal 57 as determined by signal MD1, if a small current through resistor 61 into amplifier is neglected. Signal MD1 thus passes through to stage 32 substantially unmodified.

When signal TD1 goes negative, transistor 51 is switched on and in consequence the base of transistor 56 is raised to a potential just above that of earth. If at that moment signal MD1 is in one of its more-positive half-cycles, transistor 56 acts as a collector-follower, its collector remaining approximately at the earth potential of its base.

If on the other hand signal MD1 is in one of its more negative half-cycles when signal TD1 goes negative, transistor 56 acts as an emitter-follower, with what was formerly the collector electrode now acting as the emitter, with the result that the output to stage 32 is again approximately zero.

Thus during a complete cycle of signal TD1 the collector electrode of transistor 56 has in effect a potential proportional of $\phi_M$ over a period of proportional to $\phi_T$ and is at zero potential for the remainder of the cycle. The mean value of the potential over the whole cycle is therefore proportional to the product $\phi_T \phi_M$ as already mentioned.

In stage 32, the outputs passed by the four gates are added at amplifier 65 and smoothed by filter 66, which accordingly transmits to the motor only the relatively slowly varying error signal.

The error signal is linearly variable with the phase difference between any of the signals TD and the corresponding one of the signals MD. If this phase difference is represented by the symbol $\phi_{TM}$—to indicate that the difference is variable with the demanded phase $\phi_T$ and the measured phase $\phi_M$, rather than with time—the graph of the error signal plotted against $\phi_{TM}$ is as shown in FIG. 8. Over 90° in either direction from the point A where the phase difference is 90° and in consequence the error signal is zero the response is linear. In general the response is triangular over the range of the servo. Clearly it is necessary, in the embodiment described above, for the servo to act quickly enough to keep the phase difference within the 180° range BB$^1$ if there is to be stable operation. Arrangements which allow the range to be extended without causing instability will now be described with reference to FIGS. 9 to 11.

Gating system 31 is duplicated at 31$^1$ where the signals MD are again controlled by signals TD. The only difference is that signals TD1 to TD4 control the gates for signals MD2, MD3, MD4, and MD1 respectively. From the signals passed by gating system 31, stage 32 develops an error singal over a lead 33 as before; a like stage 32$^1$ develops from gating system 31$^1$ another error signal over a lead 33$^1$. After conversion to squarewave form at stages 71 and 71$^1$ respectively, these error signals are applied to a range extender stage 72.

Owing to the difference of the gating combinations of system 31$^1$ compared with those of system 31, the error signal developed by stage 32$^1$ is 90° out of phase with that developed by stage 32. These error signals are shown together at (a) in FIG. 10, which is a repetition of FIG. 8 with the new error singal added in broken lines. The corresponding squared signals are shown at (b). These squared signals are for convenience of reference designated $E_A$ and $E_B$, the suffixes indicating the point of operation (with error signal zero) on the $\phi_M$ coordinate.

In dependence on the relative values of signals $E_A$ and $E_B$, stage 72 controls by negative and positive voltage clamps 73 and 74, respectively, the potential range of the now revised error signal in a lead 75 to which the output from squarer stage 71—that is, error signal $E_A$—is connected by way of a resistor 76. Lead 75 is connected to motor 34 (FIG. 1).

Stage 72 contains simple logical elements which respond to the relative values of signals $E_A$ and $E_B$, as follows, to extend the range of stable operation from B$^1$B to E$^1$E, see (b) in FIG. 10.

Considering first the $E_A$ and $E_B$ waveforms at (b) in FIG. 10 for positive values of $\phi_{TM}$, it will be seen that to preserve stability over the further range BE, the negative voltage clamp of stage 73 needs to be applied throughout it. The logic causes clamp 73 to be applied at the point B when signals $E_A$ and $E_B$ are both negative, and release it (at the point E) when $E_A$ and the complement of $E_B$ (i.e. $\overline{E}_B$) are negative—in each case when $\phi_{TM}$ is positive. This extension of the negative error signal is indicated by the chain-dotted line 77 (at (a) in FIG. 10).

Similarly clamp 74 is applied at the points B$^1$ where $\overline{E}_A$ and $E_B$ are negative and is released at E$^1$ when $\overline{E}_A$ and $\overline{E}_B$ are both negative, in this case when $\phi_{TM}$ is negative. The positive error signal is thus extended as shown at 78.

Thus, as shown in FIG. 11, the logical elements may include for this purpose two flip-flop stages 81 and 82 allocated to positive values of $\phi_{TM}$ (and so controlling the negative clamp 73) and to negative values of $\phi_{TM}$ (and clamp 74), respectively.

Stage 81 is arranged to be set, and so apply clamp 73, by the combination of signals $E_A$ and $E_B$ applied by way of a three-entry And gate 83 responsive to negative-going inputs. The third entry is supplied by a negative signal from stage 82 when in its reset condition, so as to inhibit the setting of stage 81 so long as stage 82 is set. The reset signal for stage 81 is supplied by signals $E_A$ and $\overline{E}_B$ by way of a two-entry negatively responsive And gate 84.

Similarly stage 82 is set and so applies clamp 74 by signals $\overline{E}_A$ and $E_B$ and a reset signal from stage 81 applied by way of a three-entry And gate 85, and reset by signals $\overline{E}_A$ and $\overline{E}_B$ by way of an And gate 86.

The inverting of signals $E_A$ and $E_B$ to produce their complements $\overline{E}_A$ and $\overline{E}_B$ is performed in any convenient manner by stages, not shown, within stage 72.

Extensions of the range beyond the points E and E$^1$ may be achieved by additional flip-flops (not shown) operated in accordance with the appropriate combinations of signals $E_A$ and $E_B$ and interconnected with the flip-flops of stage 72 to prevent any overlapping.

Various details of the above described embodiments may be achieved by additional flip-flops (not shown) op- example, as will be apparent from an understanding of the embodiment of FIG. 9, the correspondence of gated and gating signals need not be liimted to that described with reference to FIG. 1, in which signals MD1 to MD4 are gated by signals TD1 to TD4 respectively. There must however be a regular rather than a random correspondence. Thus signals TD1 to TD4 may be gated by MD2, 3, 4, and 1, respectively, or by MD3, 4, 1, and 2, respectively, and so on. The only difference in result is a shift in phase of the error signal as plotted against $\phi_{TM}$, such as the shift of signal $E_B$ with respect to $E_A$ shown at (b) in FIG. 10.

The arrangement may be such that the number of rectangular signals in each combination is other than four; but it should not be less than three.

It is not essential for the command signals to be derived from a tape or other recording medium; they may for example be received over a transmission system from a source at a distance.

What we claim is:

1. Servo apparatus for controlling the position of an object in dependence on the relative phase of cyclic reference and main demand signals including means for deriving from the main signal under the control of the reference signal N first-combination rectangular signals width modulated in such dependence on said relative phase of the demand signals that the mean level of each rectangular signal varies with that phase in accordance with a triangular law, the respective N cyclic triangular waveforms being symmetrically spaced with respect to one another, and N being an integer not less than three, means for deriving reference and main measurement signals the relative phase of which varies in dependence on the actual position of the object, means for obtaining from the main measurement signal under the control of the reference measurement signal N second-combination rectangular signals width-modulated similarly to the first-combination signals but in dependence on the relative phase of the measurement signals and at a considerably greater repetition frequency, a gating system for so gating the second-combination signals by the first-combination signals, each to each, as to produce N product signals the mean value of each of which over each cycle of the gating signal is proportional to the product of the extents of width modulation of that signal and of the corresponding gated signal, a filter stage to derive from said product signals an error signal which varies in sense and value with the departure from a predetermined phase relationship of said relative phases with respect to one another, and servo-actuator means for applying the error signal to adjust the position of the object in the sense to counteract such departure.

2. Apparatus as claimed in claim 1 wherein the means for deriving the first-combination signals include means for obtaining from the reference demand signal in fixed frequency and phase relationship thereto N reference demand squarewave signals equally spaced in phase, means for obtaining from the main demand signal in fixed frequency and phase relationship thereto a main demand squarewave signal, and a gating network for deriving the first-combination signals from the main demand squarewave signal under the control of the reference demand squarewave signals.

3. Apparatus as claimed in claim 2 wherein the gating network includes And-gating means for combining the main demand squarewave signal with each of the N reference demand squarewave signals to produce N rectangular demand signals, means for deriving for each rectangular demand signal a like rectangular signal but displaced by 180 electrical degrees, and Or-gating means for combining each rectangular demand signal with the corresponding displaced signal, thereby producing the N first-combination signals.

4. Apparatus as claimed in claim 2 wherein the gating network includes Or-gating means for combining the main demand squarewave signal with each of the N reference demand squarewave signals to produce N rectangular demand signals, means for deriving for each rectangular demand signal a like rectangular signal but displaced by 180 electrical degrees, and And-gating means for combining each rectangular demand signal with the corresponding displaced signal, thereby producing the N first-combination signals.

5. Apparatus as claimed in claim 1 wherein the gating system is arranged to pass to the filter stage such portions of each second-combination signal as occur during the presence of each portion of one sense of the corresponding gating signal.

6. Apparatus as claimed in claim 5 wherein the filter stage includes means for adding together all the N second-combination signals as passed by the gating system and means for smoothing them sufficiently to produce the error signal.

7. Apparatus as claimed in claim 1 wherein a second gating system is provided for so gating the second-combination signals by the first-combination signals as to develop a second error signal the variation of which with respect to said relative phases is out of phase with the corresponding variation of the first-mentioned error signal, two clamping stages for respectively clamping in one or other sense the polarity of the error signal as applied to the servo-actuator means, and a range-extender stage containing logical elements for controlling the clamping stages in such response to the two error signals that whenever an end of the normal range of stable operation is reached the appropriate clamping stage is actuated to extend the range in that direction.

References Cited

UNITED STATES PATENTS

| | | |
|---|---|---|
| 2,983,872 | 4/1961 | Williamson et al. |
| 3,098,186 | 7/1963 | Williamson et al. |
| 3,122,686 | 2/1964 | Davies et al. |
| 3,181,046 | 5/1965 | Sutton. |

ORIS L. RADER, Primary Examiner

T. E. LYNCH, Assistant Examiner

U.S. Cl. X.R.

318—162

PO-1050
(5/69)

UNITED STATES PATENT OFFICE
CERTIFICATE OF CORRECTION

Patent No. 3,457,480          Dated July 22, 1969

Inventor(s) Ernest Thomas Angus et al.

It is certified that error appears in the above-identified patent and that said Letters Patent are hereby corrected as shown below:

Column 2, line 72, "and" should read --to--. Column 6, line 69, "of", first occurrence, should read --to--, and "of", second occurrence, should be cancelled. Column 7, line 39, "$\phi_M$" should read --$\phi_{TM}$--; line 61, "points" should read --point--. Column 8, line 17, cancel "achieved by additional flip-flops (not shown) op-" and substitute --modified in accordance with the invention. For--; line 20, "liimted" should read --limited--.

**SIGNED AND
SEALED
MAR 24 1970**

(SEAL)
Attest:

Edward M. Fletcher, Jr.
Attesting Officer

WILLIAM E. SCHUYLER, JR.
Commissioner of Patents